United States Patent Office 3,348,346
Patented Oct. 24, 1967

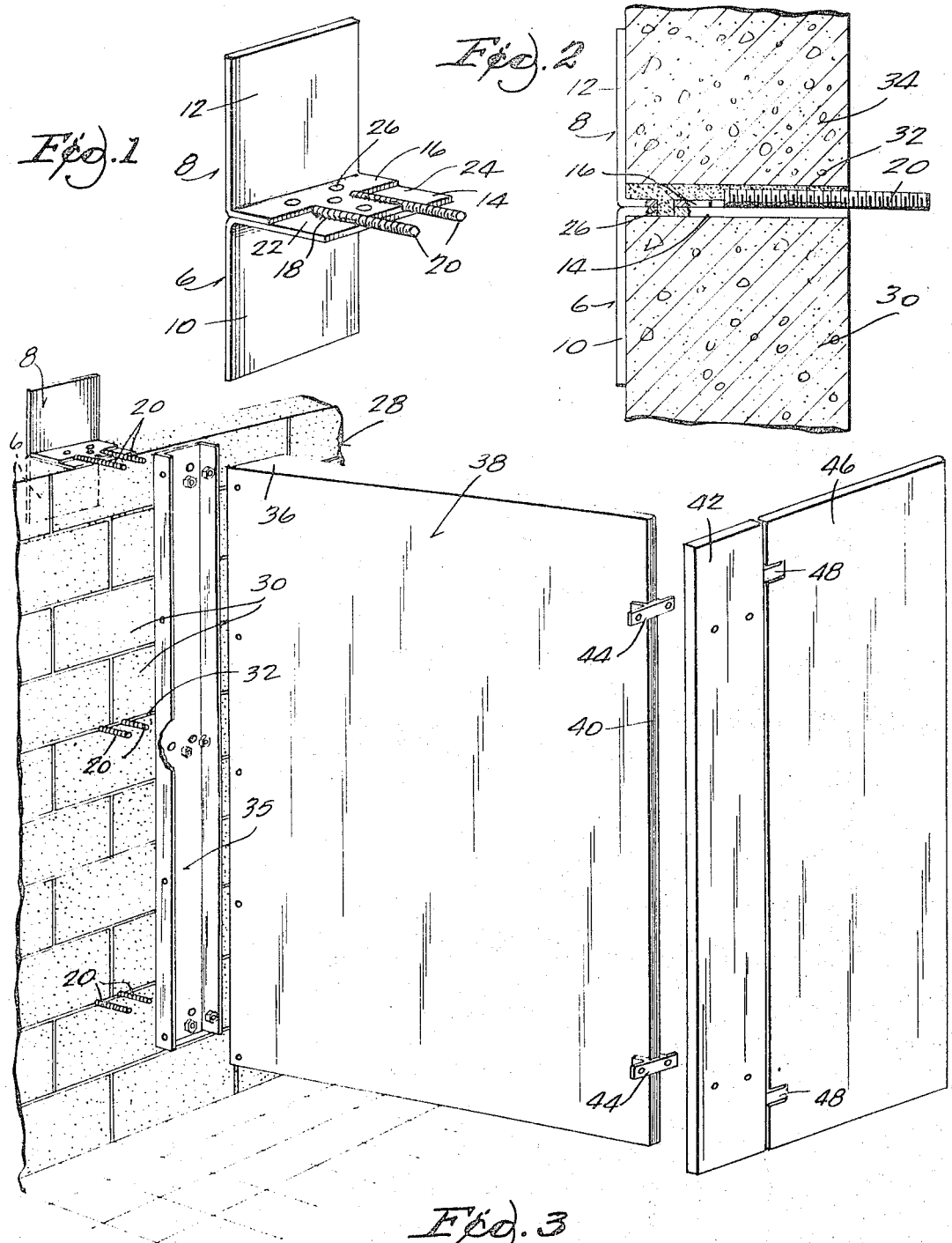

3,348,346
BRACKET FOR MOUNTING PARTS
ON MASONRY
William J. Heim, Milwaukee, Wis., and Larry E. Schleutker, Jr., Berwyn, and John A. Kuhn, Rolling Meadows, Ill., assignors to Milwaukee-Ferrometal Stamping Corp., Chicago, Ill., a corporation of Illinois
Filed Oct. 19, 1965, Ser. No. 497,780
4 Claims. (Cl. 52—239)

ABSTRACT OF THE DISCLOSURE

A partition wedge-shaped in plan is mounted on a channel held to a masonry wall by means of brackets positioned in mortar joints and each comprising projecting mounting screws welded to the facially contacting and mutually welded legs of two angles which respectively have their other legs directed oppositely to abut the rear of the wall.

This invention relates to a bracket for mounting parts on masonry. As shown, the bracket is specifically designed for the attachment of a toilet partition to a masonry wall.

In the drawings:

FIG. 1 is a view of the bracket in perspective.

FIG. 2 is a detail view in section showing the bracket in place within a wall, portions of which are fragmentarily illustrated.

FIG. 3 is a view in perspective on a reduced scale showing in mutually spaced positions the various components of the partition installation.

The bracket comprises a pair of angled plates 6 and 8 having mutually divergent legs 10 and 12 respectively and other legs 14 and 16 which are in face contact. Welding at 18 not only joins the legs 14 and 16 to each other but anchors screw threaded attachment rods 20 to the assembly. To receive and position these rods, the leg 16 of bracket 8 has lateral notches at 22 and 24 in which the rods 20 are positioned. Openings 26 are provided to receive mortar for further keying the bracket to a wall in which it is mounted.

The wall 28 comprises blocks 30. The bracket is laid on top of one block 30 and becomes imbedded in the mortar 32 which unites the next superimposed block 34 to block 30. The portions 10 and 12 of the angles 6 and 8 abut the rear faces of the respective blocks 30 and 34, as clearly shown in FIG. 2. Because the mortar is keyed to the fitting and because of the engagement of the divergent legs 10 and 12 of the bracket with the rear faces of the blocks, the screw threaded rods 20 relied on for attachment of other equipment are extremely securely fixed to the wall.

In the instant device, a plurality of brackets at different levels are used to anchor an upright panel 35 to the wall 28. The channel has apertures properly located to receive the rods 20 of the several brackets at different levels. Fitted within the channel is the broad rear margin 36 of the wedge-shaped partition 38. The convergent side panels of the partition provide inherent bracing for the forward margin 40 of the partition to which the pilaster 42 is held by brackets 44. To this pilaster the doors 46 are pivoted by any appropriate hinges. These may be of the type shown at 48.

We claim:

1. A bracket comprising unitarily a pair of angles having oppositely extending back legs, and forwardly extending legs substantially in face contact with each other, and threaded attachment rods in welded connection with the forwardly extending legs.

2. A bracket according to claim 1 in which welds secure in unitary connection those legs of the angles which are substantially in face contact and which comprise a forwardly projecting portion of the bracket, one of said legs having notches defining positions in which said rods are disposed and fixed by said welds, said forwardly projecting portion having at least one mortar-receiving opening.

3. A masonry wall comprising lower and upper superimposed blocks and an intervening mortar joint, a bracket disposed in the mortar joint between blocks and comprising angles having leg portions extending upwardly and downwardly in engagement with the rear faces of the lower and upper blocks, said angles having leg portions in substantial face contact and in welded connection with each other and extending forwardly through the mortar joint and provided with threaded attachment rod extensions welded to said forwardly projecting portions exposed at the face of the wall beyond said mortar joint.

4. A masonry wall comprising superimposed blocks and intervening mortar joints, brackets disposed in vertically spaced mortar joints of said wall between the blocks thereof and each comprising angles having leg portions extending upwardly and downwardly in engagement with rear faces of blocks of said wall, said angles having forwardly projecting leg portions in face contact with each other and in permanent welded connection with each other, the leg portions so connected extending forwardly through respective mortar joints and provided with threaded attachment rod extensions welded to the said connected leg portions and projecting beyond the front face of the wall, a channel extending vertically on the front face of the wall and having apertures through which the rod extensions project, said channel having laterally spaced flanges projecting away from the wall, a wedge-shaped partition having a broad rear margin fitted to said channel and connected therein, a pilaster connected with said partition remote from the wall, and a door in hinged connection with the pilaster.

References Cited

UNITED STATES PATENTS

| 2,829,514 | 4/1958 | MacLean | 52—714 X |
| 2,831,339 | 4/1958 | Jones | 52—27 |
| 2,865,476 | 12/1958 | Schooler | 52—27 |
| 3,283,453 | 11/1966 | Schooler | 52—239 X |

FOREIGN PATENTS

| 333,054 | 9/1930 | Great Britain. |

ROY D. FRAZIER, Primary Examiner.
F. DOMOTOR, Assistant Examiner.